United States Patent [19]

Hagen

[11] 4,155,046

[45] May 15, 1979

[54] SEGMENTED AMPLIFIER CONFIGURATIONS FOR LASER AMPLIFIER

[75] Inventor: Wilhelm F. Hagen, Livermore, Calif.

[73] Assignee: The United States of America as represented by the United States Department of Energy, Washington, D.C.

[21] Appl. No.: 868,641

[22] Filed: Jan. 11, 1978

[51] Int. Cl.² ............................................. H01S 3/092
[52] U.S. Cl. ................................. 330/4.3; 331/94.5 P
[58] Field of Search .................... 330/4.3; 331/94.5 C, 331/94.5 D, 94.5 E, 94.5 F, 94.5 P

[56] References Cited

U.S. PATENT DOCUMENTS

| | | | |
|---|---|---|---|
| 3,423,691 | 1/1969 | Chernoch et al. | 330/4.3 |
| 3,487,330 | 12/1969 | Gudmundsen | 331/94.5 T |
| 3,500,230 | 3/1970 | Tomiyasu et al. | 330/4.3 |
| 3,560,872 | 2/1971 | Heimann | 331/94.5 F |
| 3,621,456 | 11/1971 | Young | 331/94.5 E |
| 3,928,811 | 12/1975 | Hughes | 330/4.3 |
| 3,986,130 | 10/1976 | Soures et al. | 330/4.3 |
| 3,988,697 | 10/1976 | Cooley | 330/4.3 |
| 4,039,962 | 8/1977 | Hughes | 330/4.3 |

OTHER PUBLICATIONS

Kacken et al., "Laser-Fusion Program", 2/11/72, pp. 24-27, UCRL-50021-71, Lawrence Linemore Lab.
Alekseev et al., "Large-Aperture Neodymium-Glass Disk Amplifier", 1/76, pp. 126-127, Sov. Journ. Quant. Elec., vol. 6, #1.
Alexandrov et al., "Experimental Studies on the . . .", pp. 365-373, 1AEA-CN-33/F3-2.
McMahon, "Optimization of Nd:Glass Lasers . . .", NRL Memorandum Rept. 3411, 11/76, pp. 1-53.

Primary Examiner—Nelson Moskowitz
Attorney, Agent, or Firm—R. S. Gaither; P. Martin Simpson, Jr.; John F. Schipper

[57] ABSTRACT

An amplifier system for high power lasers, the system comprising a compact array of segments which (1) preserves high, large signal gain with improved pumping efficiency and (2) allows the total amplifier length to be shortened by as much as one order of magnitude. The system uses a three dimensional array of segments, with the plane of each segment being oriented at substantially the amplifier medium Brewster angle relative to the incident laser beam and with one or more linear arrays of flashlamps positioned between adjacent rows of amplifier segments, with the plane of the linear array of flashlamps being substantially parallel to the beam propagation direction.

7 Claims, 8 Drawing Figures

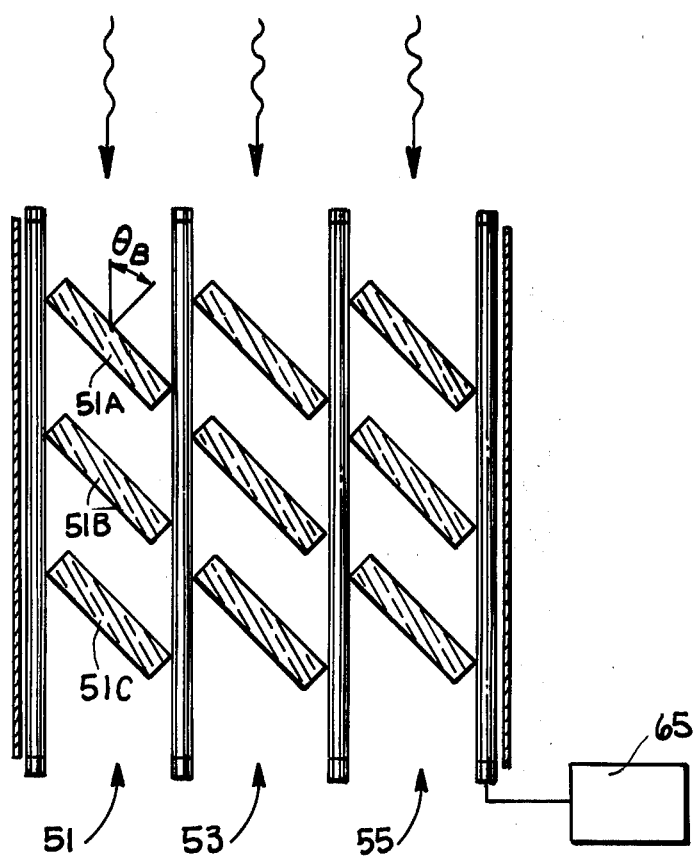
_Fig. 6_
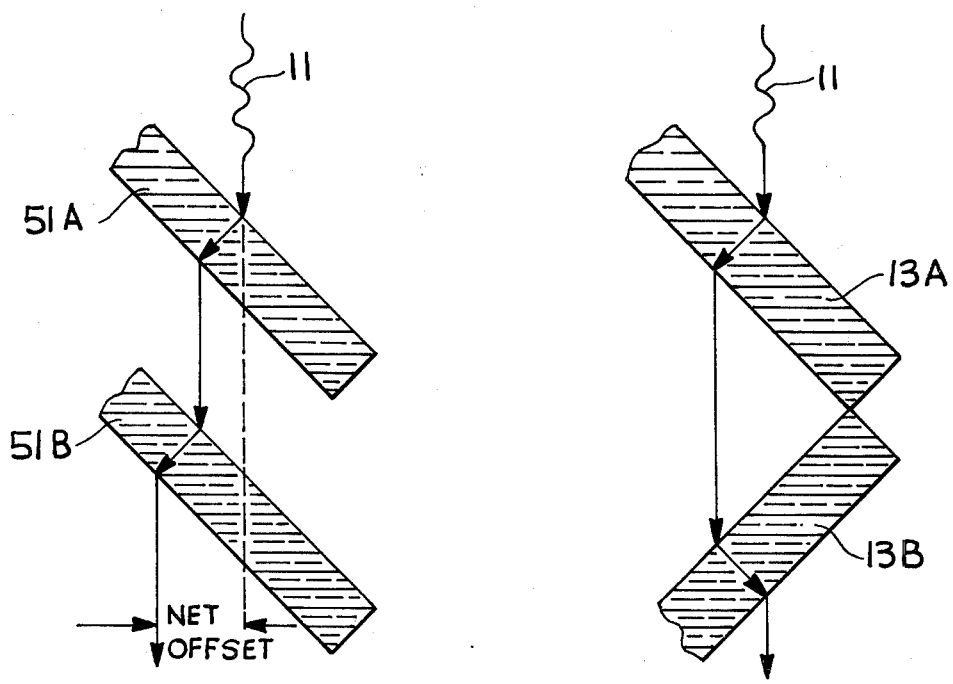
_Fig. 8_  _Fig. 7_

SEGMENTED AMPLIFIER CONFIGURATIONS FOR LASER AMPLIFIER

The invention described herein arose at the University of California Lawrence Livermore Laboratory, in the course of or under contract W-7405-ENG-48 with the United States Department of Energy.

FIELD OF THE INVENTION

This invention relates to the use of segmented laser amplifiers in a three dimensional array. More particularly, the present invention relates to segmented laser amplifiers with efficient use of flashlamp illumination for amplification of a single laser beam passing therethrough.

BACKGROUND OF THE INVENTION

For high power laser systems, the development of efficient, large aperture amplifiers can significantly improve the performance to cost ratio, due to the high fixed costs and complexity associated with the usual array of small aperture chains of equivalent output power. At one extreme, the use of a large aperture amplifier may avoid the constraint of maximum beam intensity imposed by optical damage thresholds (normally 4–10 $J/cm^2$ for the most easily damaged components), by distributing the beam to be amplified over a larger area. At the other extreme, one is limited at the upper end on size of an amplifier element by the amplified fluorescence losses within the element; this process limits the available gain coefficient by depletion of the population inversion of the amplifier medium.

In "Optimization of Nd:Glass Lasers with Phosphate-Laser Glass" J. M. McMahon, NRL Memorandum Report 3411 (November 1976) arrays of separate beams are spaced so closely together that flashlamps illuminating one solid state amplifier segment illuminate the segments in a separate adjacent laser amplifier. Only circular cross-sectional beams appear to be contemplated, and each beam is a separate laser beam run through a common pumping cavity with some flashlamps illuminating amplifier segments in adjacent beams.

In V. V. Alexandrov et al, "Experimental Studies on the Interaction of Laser Radiation with Plasma in Mishen-1 and Mishen-2 Devices", IAEA-CN-33/F3-2, p. 365 at p. 369 a three Nd:glass slab amplifier is disclosed with slabs 40×240×700 mm to amplify three well-collimated laser beams in parallel. The location of the flashlamps is not disclosed, but the flashlamps are termed closely packed. While in oral conversations with some of the Russian designers of the Mishen-1 and 2 devices it was disclosed that the flashlamps are positioned between the Nd:glass slabs, as well as about their exterior, but the inventor has no independent knowledge to affirm that or the arrangements and effectiveness of same. The flashlamps have been placed with their longitudinal axis running parallel to the laser beams and in other designs running perpendicular to the laser beams. Visiting American scientists have been shown the Mishen-1 apparatus. The Russian work shows only a single solid slab for a given amplification stage per laser beam, and the laser beams at the parallel amplifiers are considered separate beams of a multiarm laser.

Russian and American designers have given attention to reducing the number of flashlamps and power supplies for a large laser through grouping separate parallel laser beams in a single amplifier cavity with separate amplification media for each beam. Making a single large beam from a segmented amplifier was not addressed. Also problems remain for the Russian approach of using solid slabs for an entire amplification stage per beam in trying to attain uniform pumping, in weight of the amplification medium, and in time the amplification medium takes to cool after a laser pulse has passed through. The use of disc amplifiers greatly eases these restrictions; however, discs are only presently designed for the 30–45 cm aperture range at maximum. The largest disc amplifier aperture presently used is 20 cm on both Argus and Shiva at Lawrence Livermore Laboratory in Livermore, Calif. NRL has considered disc amplifiers for a clustered set of separate laser beams run through a flashlamp cavity, but NRL did not progress to the more compact rectangular discs or amplification of a large cross-sectional laser beam by a segmented amplifier.

SUMMARY OF THE INVENTION

The subject invention is apparatus for a segmented laser amplifier array of reduced length, the apparatus comprising a large number of segments formed in a three dimensional array, with the plane of each segment being oriented at substantially the amplifier medium Brewster angle relative to the incident light beams; a mechanical support structure for holding the individual segments; one or more linear arrays of flashlamps, positioned between adjacent rows of amplifier segments; flashlamp excitation means; and optical reflectors adjacent to the amplifier segment arrays and flashlamps.

One object of the subject invention is the provision of a segmented amplifier of reduced size and length which will suppress amplified fluorescence losses while allowing increased flashlamp pumping efficiency.

Another object of the subject invention is to provide an efficient segmented amplifier for a single large laser beam.

Another object of the subject invention is to provide an amplifier for a high energy laser beam.

Another object of the subject invention is to provide a large aperture amplifier for a high energy laser beam.

Another object of this invention is to use segments in a chevron array which effectively cancels the beam vector offset brought about by the passage of a paraxial beam ray through two consecutive amplifier segments.

Another object of the invention is the use of internal reflectors and end reflectors with sidewall reflectors to increase the efficiency of absorption of the flashlamp by the amplifier segments.

Other objects and advantages of this invention will become apparent from the following detailed description of preferred embodiments, as illustrated in the accompanying drawings.

BRIEF DESCRIPTION OF THE DRAWINGS

FIG. 6 is a top view of a segmented amplifier in a parallel displacement array, with a longitudinal array of flashlamps.

FIG. 7 exhibits a light ray path in two adjacent segments in the chevron array for segments, illustrating the automatic correction for beam offset.

FIG. 8 exhibits a light ray path in two adjacent segments in the parallel displacement array for segments, illustrating the accumulation of beam offset.

DETAILED DESCRIPTION

Figure 1:
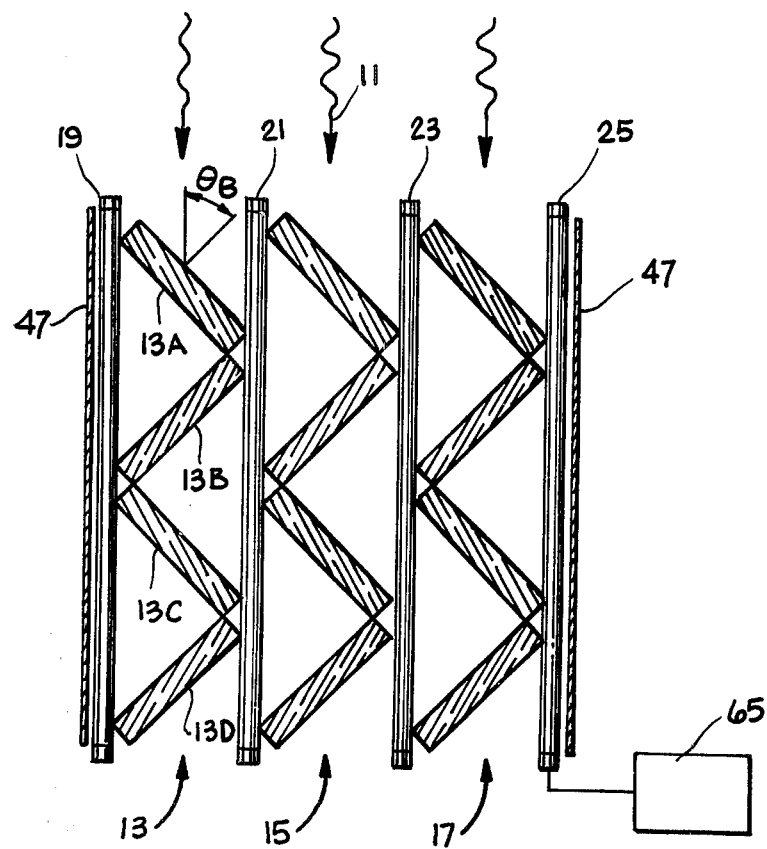
FIGS. 1 and 2 are top and front views, respectively, of a segmented amplifier in a chevron array, with a longitudinal array of flashlamps.
Figure 2:
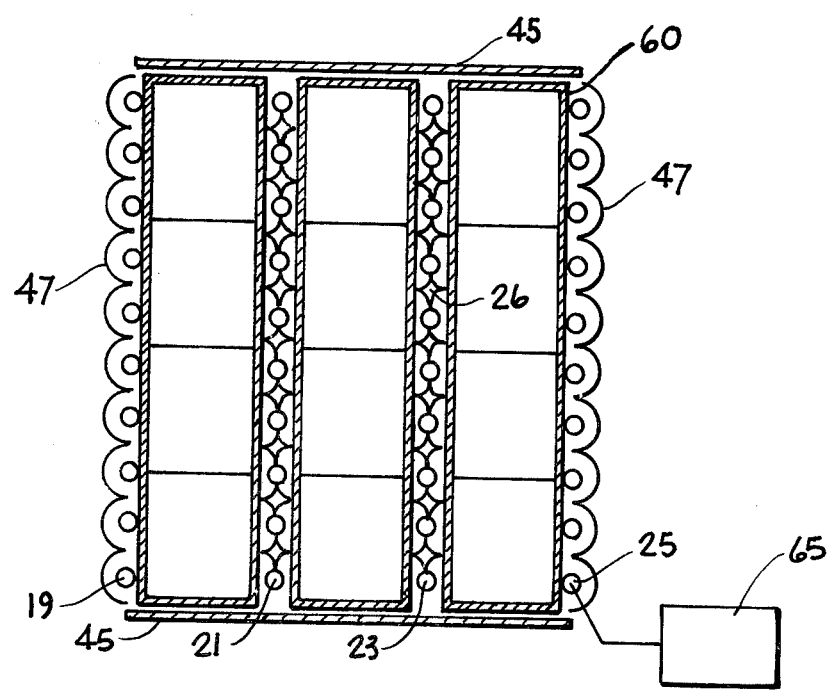
Figure 5:
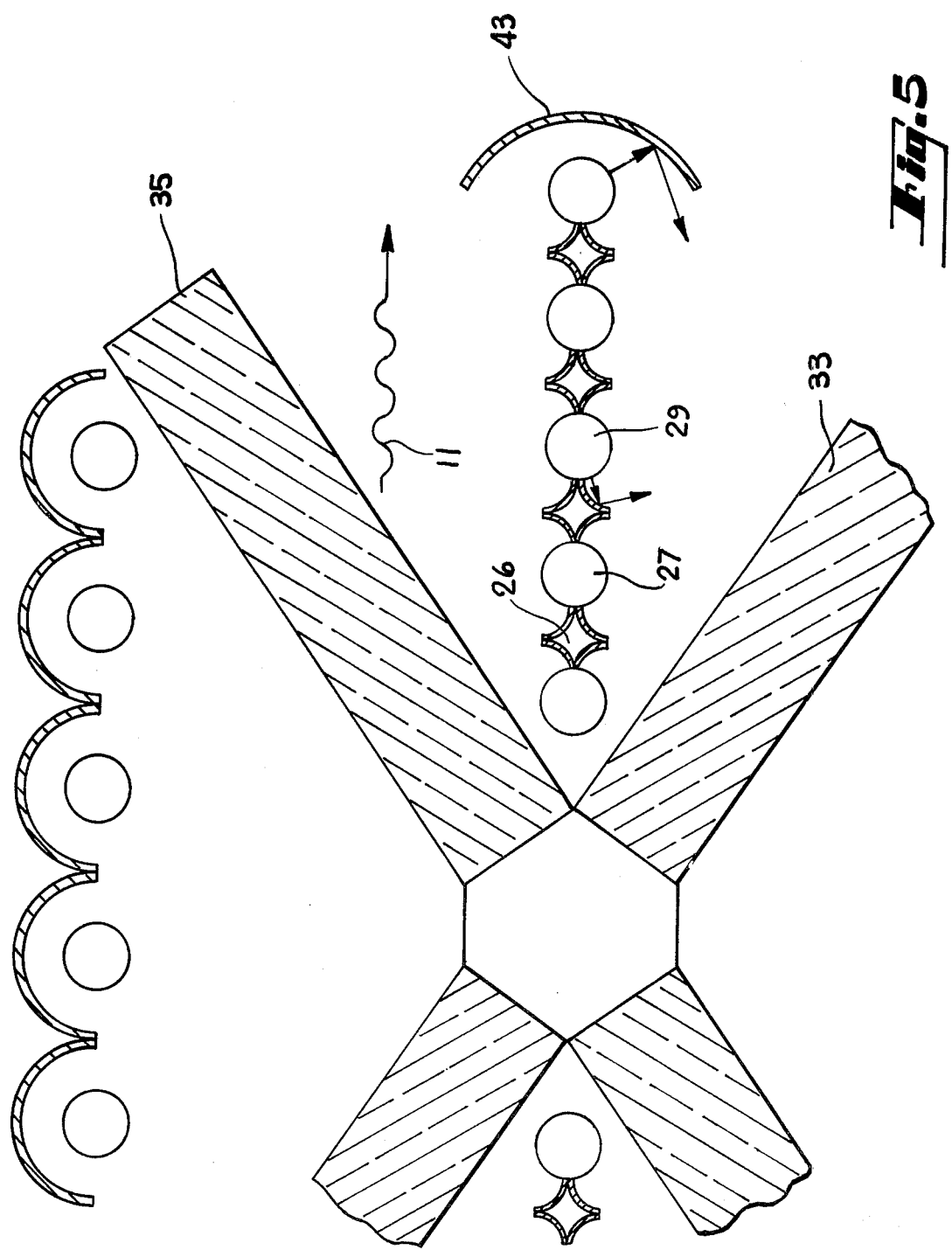
FIG. 5 is a more detailed view of the flashlamp arrangement, here shown in conjunction with the transverse flashlamp array.

The subject invention is shown in FIG. 1 (top view) and FIG. 2 (front view) in an embodiment employing flashlamps arranged in a longitudinal array relative to the incident laser beam. A laser amplifier is decomposed into a number of segments, and the segments 13A, 13B, 13C, 13D, etc. are arranged in an open triangular or chevron array as shown in FIG. 1, with the normal to the face of each amplifier segment arranged at the Brewster angle $\theta_B$ of the amplifier medium relative to the propagation direction of the incident laser beam 11. Two or more chevron arrays of segments are arranged in rows 13, 15, 17, etc. as shown in FIG. 1, and planar arrays of flashlamps 19, 21, 23, 25, etc. are arranged between the segment rows as shown, each plane of flashlamps separating two adjacent arrays of amplifier segments and being generally parallel to the direction of propagation of laser beam 11. Each internal plane or layer (21 and 23 in FIG. 1) of the flashlamps pumps the two adjacent arrays of segments so that very effective internal reflectors 26 (FIG. 2) can be placed between the individual lamps in a plane or layer, for example 21 or 23. One such design of the internal reflectors 26 is shown in FIG. 5, wherein each pair of adjacent flashlamps 27 and 29 in a given layer is separated by an internal reflector 26 in the form of a curvilinear quadrilateral having generally concave surfaces as shown in FIG. 5. The internal reflector 26 might be a curvilinear quadrilateral of some metal such as copper having a highly reflective silver coating deposited thereon to reflect most or all of the flashlamp light on to the adjacent amplifier segments such as 35 and 33. Mechanical support 60 maintains the orientation of each amplifier segment. There is a great variety of means and mechanical apparatus that the segments can be supported by all of which are simply a matter of design choice. Excitation means 65 synchronously energizes the flashlamps in a known manner as is accomplished on any known multiarm laser, such as the Argus and Shiva lasers at Lawrence Livermore Laboratory in Livermore Calif.

Figure 3:
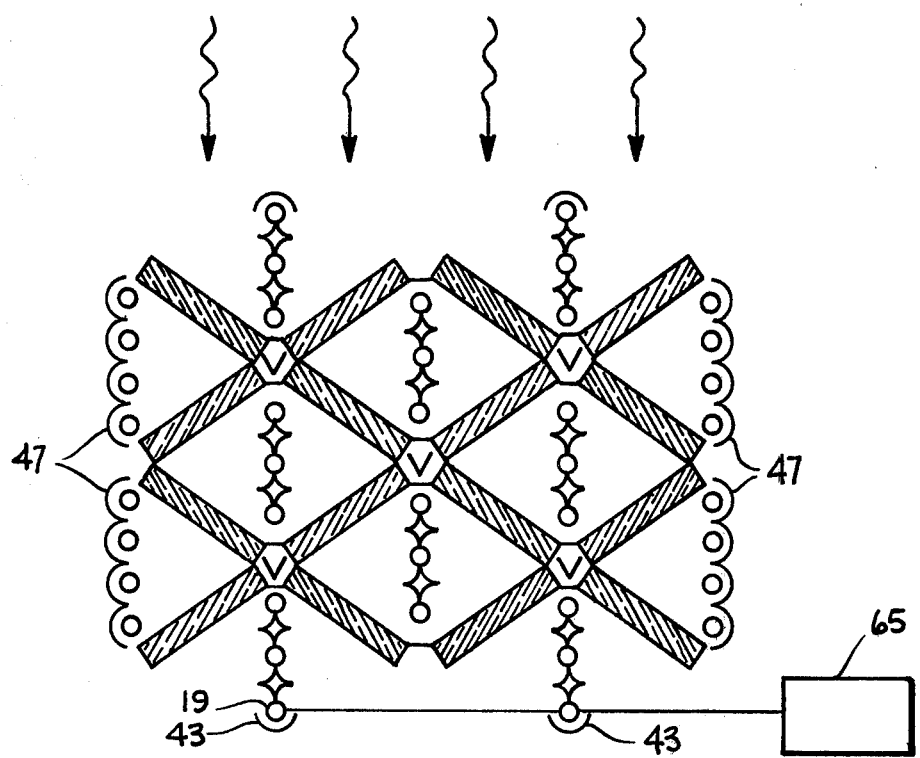
FIGS. 3 and 4 are top and front views, respectively, of a segmented amplifier in a chevron array, with a transverse array of flashlamps.
Figure 4:
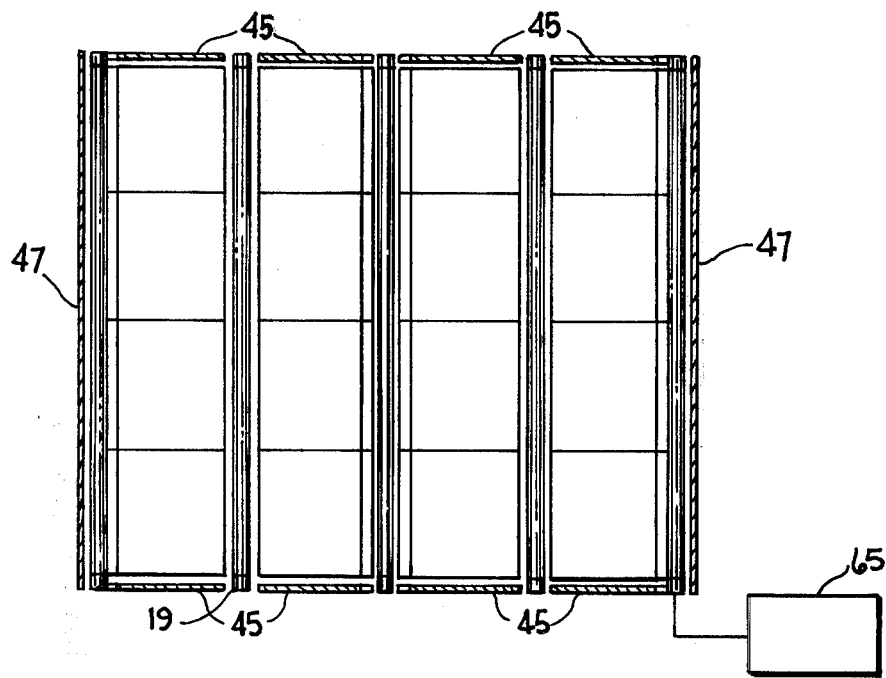

FIGS. 3 and 4 exhibit the top view and front view, respectively, of another embodiment of a segmented amplifier array, wherein the axes of the individual flashlamps 19 comprising any particular row are now oriented transversely to the direction of propagation of the laser beam 11. In the transverse embodiment, flashlamp end reflectors 43 (FIG. 5) may be placed at the open ends of the flashlamp layers to redirect the flashlamp light that would otherwise escape therefrom. Planar sidewall reflectors 45 (FIGS. 2 & 4), lying perpendicular to the planar arrays of flashlamps, may be positioned at the boundaries of the amplifier system in any embodiment in order to redirect any escaping flashlamp radiation, for increased efficiency. External reflectors 47 (FIGS. 1-4) may be positioned adjacent to the external flashlamps (19 and 25 in FIGS. 1 and 2) to redirect a portion of the radiation inwardly toward the adjacent amplifier segments. The use of internal reflectors 26 also reduces the problem of flashlamp self-absorption, wherein one flashlamp may absorb an appreciable fraction of the radiation emitted by an adjacent flashlamp. With the arrangement shown in FIG. 5, essentially all light emitted by a given flashlamp is directed to an individual segment 33 or 35. Use of internal reflectors, end reflectors and/or sidewall reflectors increases the efficiency of absorption of the flashlamp light by the amplifier segments.

Another embodiment of the subject invention is shown in FIG. 6, a side view of a segmented array, wherein the axes of the flashlamps are parallel to the light beam propagation direction. In this embodiment, the chevron arrays of amplifier segments shown in FIGS. 1 and 3 are replaced by rows 51, 53, 55, etc. in a "parallel displacement array" of such segments (shown in FIG. 6), comprising a longitudinal sequence of parallel amplifier segments, 51A, 51B, 51C, etc., spaced apart and having amplifier face normals oriented at the Brewster angle $\theta_B$ relative to the light beam propagation vector. The various reflectors may be arranged as in FIGS. 1-4.

One advantage of the chevron array, illustrated in FIG. 7, is the cancellation of beam vector offset by the passage of any paraxial ray in the beam through two consecutive amplifier segments: As long as the indices of refraction of two consecutive segments are nearly identical, the net effect of passage of the paraxial ray through both segments is minimal change in transverse displacement. FIG. 8 illustrates one disadvantage of the parallel displacement array of segments of FIG. 6. The beam vector offsets (net change in radial displacement) for each two segments add, rather than cancelling; with a sufficient number of amplifier segments (FIG. 8) interposed, any ray, even an initially axial ray, will eventually "walk off" the amplifier system.

A further improvement in overall efficiency is obtained by the suppression or elimination of amplified fluoresence losses, accomplished by reducing the size of the segment. A large amplifier diameter is maintained by use of a multiplicity of rows (13, 15, 17 in FIG. 1) of amplifier segments in the system. For an off-axis system, wherein the direction of propagation of laser beam is not parallel to the layers of flashlamps but is offset by a small angle therefrom, beam vignetting losses can occur; and a tradeoff between parasitic fluorescence losses and beam vignette losses determines the proper size of the individual segments. One major advantage of segmented amplifier design is the reduction of the effective length of the amplifier, by a factor of 3 to 10 for the designs contemplated here. Reduction of the effective amplifier length also reduces beam vignetting for a given size segment.

With these designs, the length of the amplifier is approximately independent of the transverse dimensions of the amplifier; this is not the case for a conventional disk amplifier design. A single disk, of conventional design but composed of M segments, requires approximately M times the length of the equivalent segmented amplifier discussed here. For example, a conventional disk amplifier with three 1.2 meter diameter disks, each disk being composed of eight 15 cm segments, would require an optical cavity length greater than 1 km in order to reduce beam vignetting to less than 20%. The equivalent segmented amplifier design reduces the required cavity length to less than 150 M, with a concomitant reduction in cost for the vacuum system.

Segmentation of a large elliptical disk provides one option for suppressing the parasitic fluorescence, as discussed in U.S. patent application Ser. No. 868,643 for Composite Solid State Laser Amplifier Disks by James A. Glaze, and in U.S. patent application Ser. No. 868,644 by John L. Emmett for a Laser System Using Regenerative Amplifier, both of which are filed simultaneously herewith and assigned to the assignee of this invention and incorporated by reference herein. The segmentation of an elliptical disk at the proper Brewster's angle requires a larger number of differently shaped segments which increases both the complexity and the cost of the components. Elliptical disks generally have a lower flashlamp pumping efficiency due to location of the flashlamps at the sides of the disks, where some of the pump light is lost due to absorption in the flashlamps and in the mechanical structures for the disks.

The chevron and parallel displacement arrays of a segmented amplifier permit the use of rectangular segments, as shown. If these segments are identical, one avoids some of the fabrication problems encountered in practicing the invention of Glaze, supra, and fewer "spares" are needed. More generally, the use of rectangular segments permits use of a more uniform cooling flow adjacent to the (shorter) segments, if a coolant is needed; results in reduced flashlamp end effects; and, as shown in FIG. 3, permits the incorporation of void areas, "V", adjacent to the amplifier segment ends so that no loss of flashlamp illumination occurs at such sites.

The claimed invention may be used to amplify a laser beam for finding ranges, joining materials, generating plasma, producing neutrons, producing x-rays, and any other method for which lasers are known to be used.

Although the preferred embodiments of the invention have been shown and described herein, it should be clear that modification and variation may be made without departing from what is considered to be the invention.

What I claim is:

1. Apparatus for a segmented laser amplifier of reduced length, the apparatus comprising:

an array of at least two rows of amplifier segments, each row being arranged in a chevron array and the rows being spaced apart transversely to the direction of the incident laser beam, each segment having two substantially parallel radiation absorbing faces that are oriented at substantially the amplifier medium Brewster angle relative to the incident laser beam;

a mechanical support for maintaining the orientation of each amplifier segment attached thereto;

a planar array of flashlamps, positioned between adjacent rows of amplifier segments, with the larger axis of the flashlamp array being substantially parallel to the direction of propagation of the incident light beam, and with each flashlamp being positioned to pump plural amplifier segments by irradiation through the faces of the segment;

excitation means, connected to the flashlamps, for synchronously energizing the flashlamps; and optical reflectors, operatively associated with the arrays of amplifier segments and flashlamps, for reflecting and containing the flashlamp light produced.

2. Apparatus according to claim 1, wherein the axes of said individual flashlamps are substantially parallel to the direction of propagation of the incident light beam.

3. Apparatus according to claim 1, wherein the axes of said individual flashlamps are substantially perpendicular to the direction of propagation of the incident light beam.

4. Apparatus according to claim 1, wherein said optical reflectors include at least one internal reflector, interspersed between pairs of adjacent flashlamps in a row of flashlamps, for reflecting the flashlamp light incident upon the internal reflector toward said amplifier segments on both sides of said optical reflector.

5. Apparatus according to claim 1, wherein said optical reflectors include at least one end reflector, positioned adjacent to one of the outermost flashlamps in said planar array of flashlamps, for redirecting flashlamp light incident upon the end reflector toward at least one of said amplifier segments.

6. Apparatus according to claim 1, wherein said amplifier segments are all of rectangular shape.

7. Apparatus according to claim 4, wherein said internal reflector is a curvilinear guadrilateral, with each segment of the boundary defining a portion of a concave surface.

* * * * *